United States Patent

[11] 3,610,885

[72] Inventor Adolphe Zingg
 15 Beauregard 3960, Sierre, Switzerland
[21] Appl. No. 865,882
[22] Filed Oct. 13, 1969
[45] Patented Oct. 5, 1971
[32] Priority Oct. 14, 1968
[33] Switzerland
[31] 15368/68

[54] HEATER GRILL
 4 Claims, 2 Drawing Figs.
[52] U.S. Cl. .................................................... 219/461,
 99/332, 219/347, 219/445, 219/478
[51] Int. Cl. ...................................................... H05b 3/68
[50] Field of Search ............................................ 219/461,
 458, 459, 444, 447, 403, 404, 405, 478, 479, 490;
 99/339, 329

[56] References Cited
UNITED STATES PATENTS

| | | | |
|---|---|---|---|
| 1,745,534 | 2/1930 | Grayson | 219/478 |
| 2,430,582 | 11/1947 | Reich | 219/478 X |
| 2,446,063 | 7/1948 | Cameron | 219/445 |
| 2,681,404 | 6/1954 | Hofer | 219/458 X |
| 2,738,723 | 3/1956 | Jennett | 99/329 |
| 3,140,389 | 7/1964 | Windes | 219/447 |
| 3,509,318 | 4/1970 | Brown | 219/479 X |

Primary Examiner—Volodymyr Y. Mayewsky
Attorney—Raymond A. Robic

ABSTRACT: A heater grill comprises a pedestal and a structure fixed thereabove. On the upper side of the structure is an electric element heating by conduction whilst on the lower side is an electric element for radiating heat towards the pedestal. A column located laterally of both pedestal and structure joins these but allows easy access for placing dishes to be heated on the pedestal.

PATENTED OCT 5 1971

3,610,885

INVENTOR
Adolphe ZINGG

Raymond E. ...
ATTORNEY

HEATER GRILL

This invention relates to a heater grill of the type having a pedestal and an upper structure fixed at a distance away from the pedestal, an electric element heating by radiation against the lower face of the said upper structure and directing radiations towards the pedestal, and an electric element heating by conduction on the upper face of the said structure with, on the pedestal, a shelf for receiving dishes. Heater grills of this type, if they are at present provided in dimensions such that they allow their easy transport from place to place, however have the drawback of having an ease of handling hardly adapted to present day requirements. In effect, nowadays, it is preferred not simply to prepare food in the company of guests, but also with their participation, at least partially. Heater grills of known type are not adapted to this kind of use because, apart from their weight, they generally have a zone closed in the manner of an oven for the dish-receiving shelf submitted to the radiation heater element. Consequently, the accessibility to this zone is unfavorably and in general the guests depend entirely on the hostess for the cooking of foods. Certain table heaters are known, but these function using a combustible liquid, which has certain drawbacks concerning the danger of fire as much as the discomforts due to the noises and odors of combustion.

The subject of the present invention is a heater grill having a general disposition which enables anyone to participate in the cooking of food and, in particular, in which the cooking is effected on the shelf of the pedestal submitted to radiations of the radiating heater element. A heater grill according to the present invention is characterized in that the upper structure of the said heater is joined to the pedestal solely by a column disposed laterally of the pedestal in a manner such that the upper structure forms with the said column a rigid structure analogous to a bracket. Advantageously, the column serves to house the electrical installations for the electrical supply of the conduction heater element.

Thanks to this arrangement, lightness and hence a remarkable ease of displacement of the heater is obtained, the accessibility to the shelf of the pedestal being considerably increased since it can be approached or plates can be placed from any angular position whatsoever, which is only limited by the presence of the bracket-forming column.

The characteristics and advantages of the invention will be apparent from the following description, made by way of example, with reference to the accompanying drawings in which.

Figure 1:
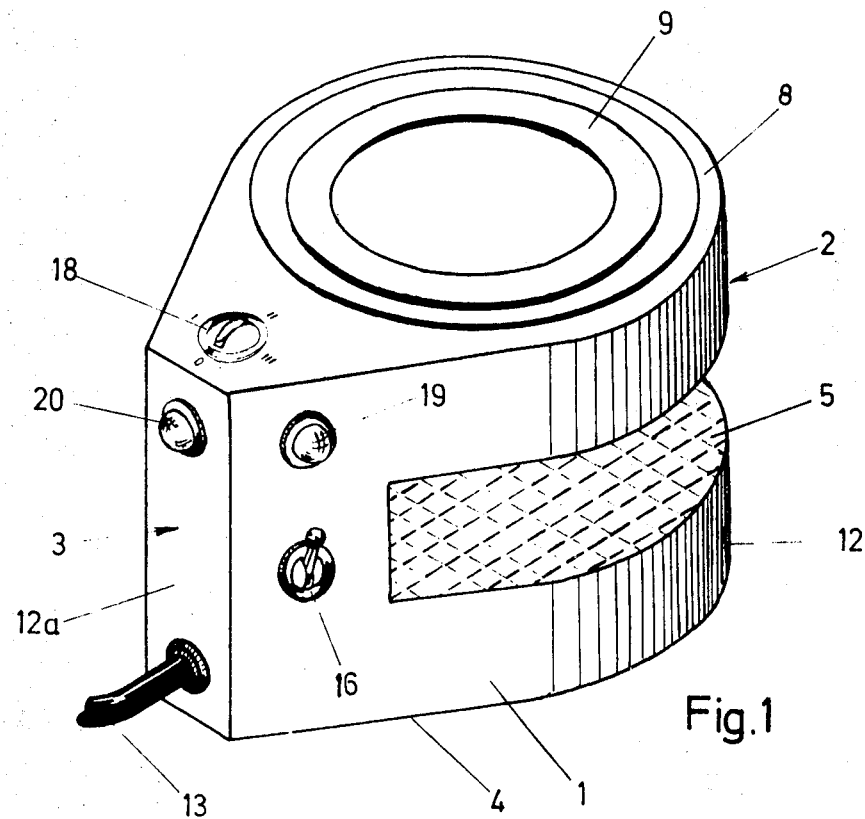
FIG. 1 is a perspective view of a heater grill according to the invention.
Figure 2:
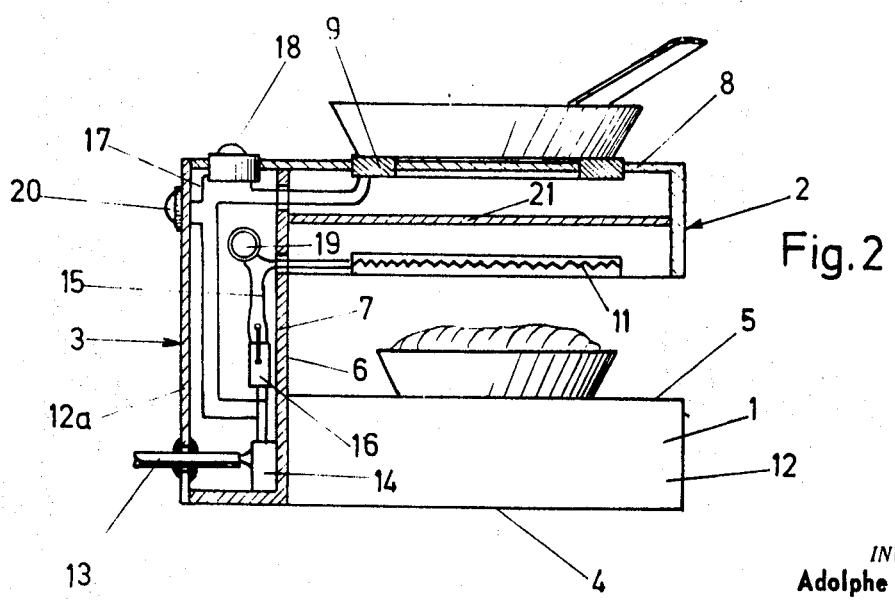
FIG. 2 is a schematic side view of the same heater grill.

Referring to the accompanying drawings, a heater grill according to the invention comprises a pedestal 1 and an upper structure 2 which is connected to the pedestal 1 by a column 3. As will be remarked from FIG. 1, the bulk of the column 3 is relatively small in relation to the surface area of the upper structure, which is situated facing the structure of the pedestal 1 and at a certain distance therefrom. The base 1 consists of a plate 4 for supporting on a surface and a shelf 5 fixed to a U-shaped iron brace 6, of which the part 7 is visible and to which is also fixed the upper structure 2, consisting of a plate 8 carrying one or more conduction heater elements 9, at the lower part of which is fixed an element 11 heating by radiation. The assembly is encased in an outer casing 12 which extends on all of the lateral surfaces, including the rear surface 12a. This rear surface 12a has an aperture for an electric supply cable 13, this cable 13 leading to a connection box itself distributing the electrical energy, by a cable 15 and a switch 16 to the radiation heating element 11, and by another cable 17 and a temperature regulating apparatus 18 to the conduction heater element 9. Two signal lamps 19 and 20 are located on the lateral surfaces 12 and 12a to indicate the functioning or the nonfunctioning of heating elements 9 and 11. Preferably a plate 21 is interpositioned between heating elements 9 and 11, this plate being insulating in respect of the upper heating element 9 and forming a reflector for the radiation heater 11.

In a preferred embodiment, the heater grill is constituted by a pedestal approximately 5 cm. thick, while the upper structure also has a thickness of 5 cm. width, between the upper structure and the upper shelf of the pedestal, a separation also of the order of 5 cm. The distance between the side 12a of the bracket and the adjacent edge of the table is of the order of 4.5 cm. The upper plate and the shelf of the pedestal have generally circular-shaped surfaces, except adjacent the support bracket, with an exterior diameter of 18 cm., while the upper shelf has an annular heating surface of which the exterior diameter is 15 cm. The outer casing 12 is provided in hammered copper or in steel plate, possibly chromed. The power of the conduction heating element is approximately 1,500 w. adjustable in a continuous manner between 0 and 1,500 w. by means of the regulation switch 18, while the power of the radiation element is from 8 to 900 w., the circuitry being controlled by a time switch to cut the circuit after a maximum time of 10 minutes, which constitutes a security measure against any unintentional prolonged radiation on the table where the heater is placed.

In this embodiment, the accessibility to the zone heated by radiation, that is to say the zone between the upper structure 2 and the pedestal 1, is of the order of 300°. It is clear that such a disposition allows an extremely convenient usage upon preparation of hot dishes in the company of guests who can sit or place themselves around the heater grill. Thus, a guest located on one side of the heater grill can have access to the lower shelf 5 in the same manner as the guest who is placed diametrically opposite. The described heater thus has a large range of uses: it can be placed on a table, practically in the middle of the guests, who can thus individually use it without having to be placed in front of conventional heating ovens. The heater is light and of small bulk and creates no risk of fire as is the case of plate heaters using combustion oils and, functioning electrically, it gives no disagreeable odors.

I claim:

1. Heater grill for simultaneously cooking two dishes comprising a pedestal including a shelf for receiving a first dish, an upper structure supported by said pedestal above said shelf by a single column located laterally of said pedestal and said upper structure for joining said pedestal to said upper structure in such a way as to permit positioning of the first dish on the shelf from a wide angular position around the heater grill, said column comprises a U-shaped iron reinforcing element, said upper structure including an electric element mounted on the lower face thereof for heating by radiation the first dish placed on said shelf and an electric element mounted on the upper face thereof for heating by conduction a second dish placed on the top of the heater grill, and a plate interpositioned between said electric heating elements and being insulating in respect of the upper heating element and forming a reflector for the lower heating element.

2. Heater grill according to claim 1, wherein said column houses electrical equipment for said grill.

3. Heater grill according to claim 1, wherein said pedestal and said upper structure each have a generally circular shape and each have an extension fixed to said column in a manner such that the open angle subtended horizontally from the center of said upper structure and said pedestal with said column is of the order of 300°.

4. Heater grill according to claim 1, wherein the upper structure and the shelf of said pedestal each have an outer diameter of the order of 18 cm., said column has a thickness within the range 4–6 cm., the thickness of said pedestal and said upper structure and the separation thereof all being of the order of 5 cm.